June 6, 1967  O. R. STARKEY  3,323,296
SUSPENSION SYSTEM FOR COMPRESSION APPARATUS
ON MECHANICAL PICKERS
Filed Nov. 13, 1964  2 Sheets-Sheet 1

ORVAL R. STARKEY
INVENTOR

Huebner & Worrel
ATTORNEYS

June 6, 1967 — O. R. STARKEY — 3,323,296
SUSPENSION SYSTEM FOR COMPRESSION APPARATUS ON MECHANICAL PICKERS
Filed Nov. 13, 1964 — 2 Sheets-Sheet 2
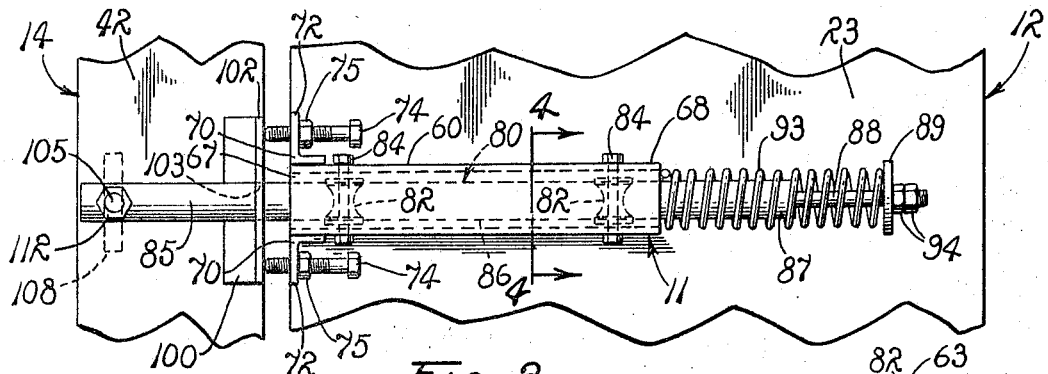
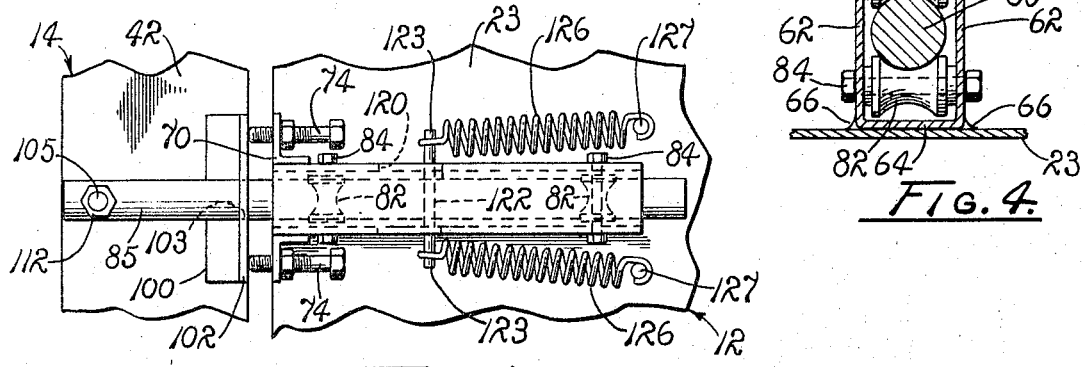
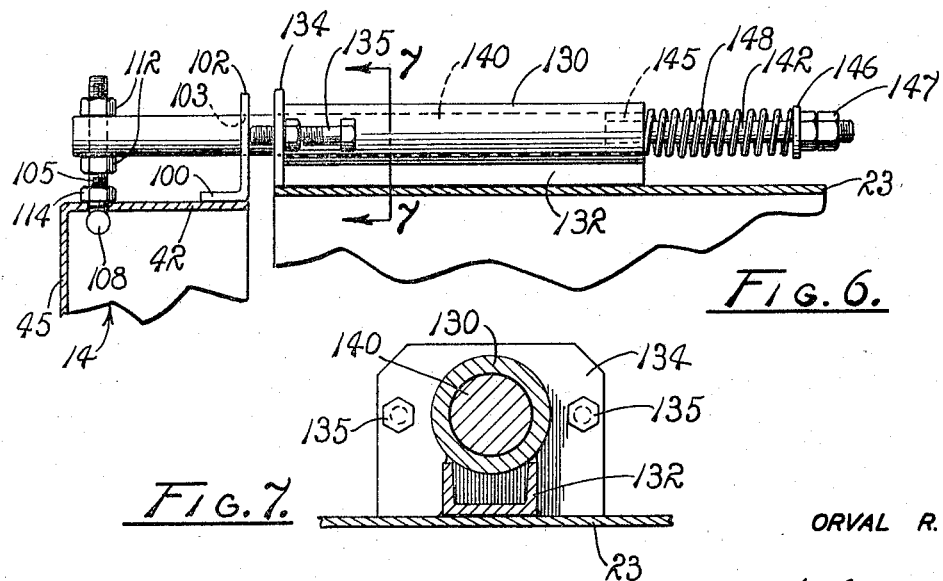
ORVAL R. STARKEY
INVENTOR
*Huebner & Worrel*
ATTORNEYS United States Patent Office 3,323,296
Patented June 6, 1967

3,323,296
SUSPENSION SYSTEM FOR COMPRESSION APPARATUS ON MECHANICAL PICKERS
Orval R. Starkey, Fresno, Calif., assignor of fifty percent to Anthony L. Lourenco, Fresno, Calif.
Filed Nov. 13, 1964, Ser. No. 411,005
7 Claims. (Cl. 56—42)

The present invention relates to a suspension system for compression apparatus on mechanical pickers and more particularly to such a system providing a substantially universal mounting for the compression apparatus for accommodating wide variations in plant shapes and sizes so that the plants can pass through the pickers with a minimum of damage. Further, the structure of the present invention may be advantageously employed on a wide variety of harvesters but is conveniently described herein for use on pickers for mechanically harvesting cotton.

The compression apparatus of my above co-pending application provides an elongated movable wall in opposed relation to rows of picking spindles within a picking zone of a mechanical cotton picker. Such structure has substantially eliminated damage to the plants which previously was experienced with the prior devices and has been successful in upgrading the quality of the harvested cotton. Although the movable wall of my compression apparatus permits limited transverse flexing of the wall relative to the picking zone, the rigid mounting of the housing for the compression apparatus, as in conventional pickers, restricts the maximum adaptation of the picking zone of the picker. Frequently, the plants to be picked vary a great deal in their shape and size. Some plants have branches which are more spreading near the bottom of the plants whereas others are more spreading adjacent to the top. Accordingly, with the structures of the prior art the spreading portions of the plants are overly compressed during movement through the picking zone causing defoliation and breakage of the plant stalks and branches. Such damage during the picking operation results in undesirable mixing of such extraneous material with the harvested cotton which must be removed in subsequent cleaning operations. It also results in staining of the cotton being harvested. Even with the resiliently flexible structure of my prior compression apparatus, the wall would flex to accommodate the larger plant portions but in so doing would permit the smaller portions of the plants to pass through the picking zone of the picker under little or no compression. This, of course, resulted in incomplete picking and an appreciable loss of mature cotton. The above described over compression by the larger plants within the picking zone of the picker also imposes undue strain on the picking spindles with frequent bending and breakage occurring.

Accordingly, it is an object of the present invention to provide an improved suspension system for compression apparatus on cotton pickers which permits the compression apparatus automatically to accommodate a wide variety of plant shapes and sizes.

Another object is to provide such an improved suspension system which is capable of permitting substantially universal movement of the compression apparatus on the picker.

Another object is to provide a suspension system of the character described which is capable of increasing the picking efficiency of the picker and substantially eliminating intermixing of extraneous material from the harvested cotton.

Another object is to provide a suspension system which is capable of maintaining the compression apparatus in optimum compressing relation against substantially all portions of the plants within the picking zone of the picker.

Another object is to provide a suspension system for compression apparatus on cotton pickers which may be pre-adjusted throughout a wide range of angular positions within the picking zone of the picker.

Other objects and advantages of the structure of the present invention will become more fully apparent on reference to the accompanying drawings and the following description in the specification.

In the drawings:

FIG. 3 is a somewhat enlarged top plan view of the arm of FIG. 2.

FIG. 4 is a somewhat enlarged transverse vertical section through the arm and mounting structure taken on line 4—4 of FIG. 3.

FIG. 5 is a top plan view of a second form of arm and biasing structure for the suspension system of the present invention.

FIG. 6 is a side elevation of a third form of arm and mounting structure for the suspension system of the present invention.

FIG. 7 is a transverse vertical section through the arm of the third form taken on line 7—7 of FIG. 6.

Figure 1:
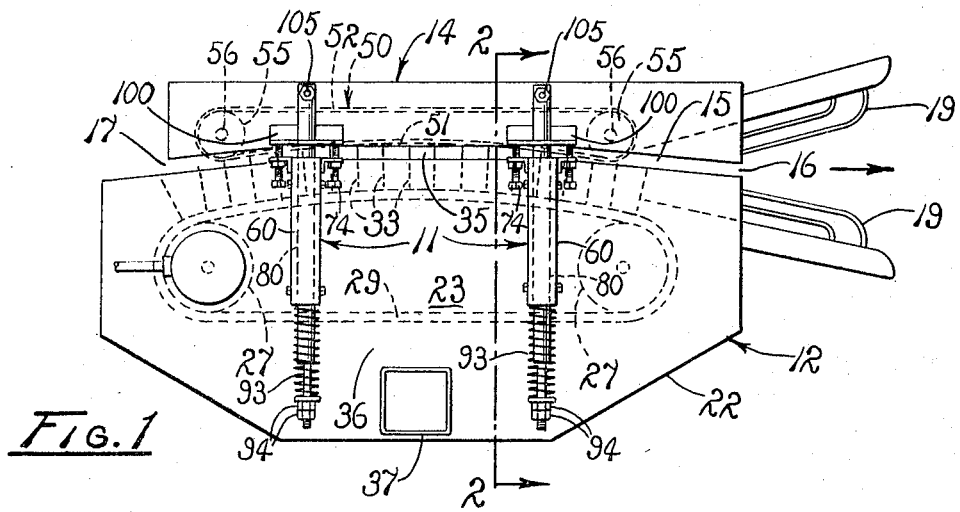
FIG. 1 is a top plan view of a suspension system embodying the principles of the present invention shown mounting a compression apparatus on a cotton picker.

Referring more particularly to the drawings, a suspension system embodying the principles of the present invention provides a pair of arm assemblies generally indicated by the reference numeral 11. As best shown in FIG. 1, the arm assemblies are mounted upon a picking unit 12 of a mobile cotton picking machine for supporting a compressing apparatus 14 thereon in closely adjacent relation to the picking unit. The compression apparatus and picking unit are somewhat spaced apart to define an elongated plant passage 15. The passage is adapted to be disposed in line with rows of plants and includes opposite inlet and outlet ends 16 and 17, respectively. A pair of forward outwardly divergently extended plant lifting elements 19 are mounted on the inlet end 17 of the passage which serve to lift and to guide the lower portions of the cotton plants through the picking unit in the well-known manner.

The picking unit 12 provides a housing 22 having an upper wall 23 and a spaced substantially parallel lower wall fragmentarily indicated by the reference numeral 24. A pair of sprocket shafts 26 are mounted for rotation in spaced relation within the housing between the upper and lower walls 23 and 24. Each of the shafts mounts a pair of upper and lower sprockets 27. A pair of endless chains 29 are individually mounted for circuitous travel about the corresponding pairs of upper and lower sprockets. A plurality of spindle bars 32 are mounted in successively equally spaced substantially upright position between the chains 29 and individually mount a plurality of picking spindles 33. The spindles on successive bars are thereby disposed in horizontally vertically spaced rows. A plurality of elongated grid bars 34 are mounted in longitudinally extended relation with respect to the passage 15 in the housing 22 in the intervals between the horizontal rows of spindles. The grid bars define one side of a picking zone 35 within the passage 15 of the picking unit 12.

As best shown in FIG. 1, the picking unit 12 provides a doffing station 36 adjacent to the run of the chains 29 opposite to the run disposed within the picking zone 35 for the removal of cotton from the housing through a pneumatic conveyor pipe 37 in the well-known manner. The spindle sprocket shafts 26 are power driven from a source on the picking machine, not shown, to drive the spindles 33 in a counter-clockwise direction, as shown in FIG. 1. As a result, the spindles are driven within the picking zone 35 in a substantially rectilinear path from the inlet end 16 of the passage 15 to the outlet end 17 thereof. As is well-known, the spindles are traveled rearwardly in the picker at substantially the same speed as the picker travels over the ground so as to remain substantially stationary with respect to the plants involved in picking operations.

Figure 2:
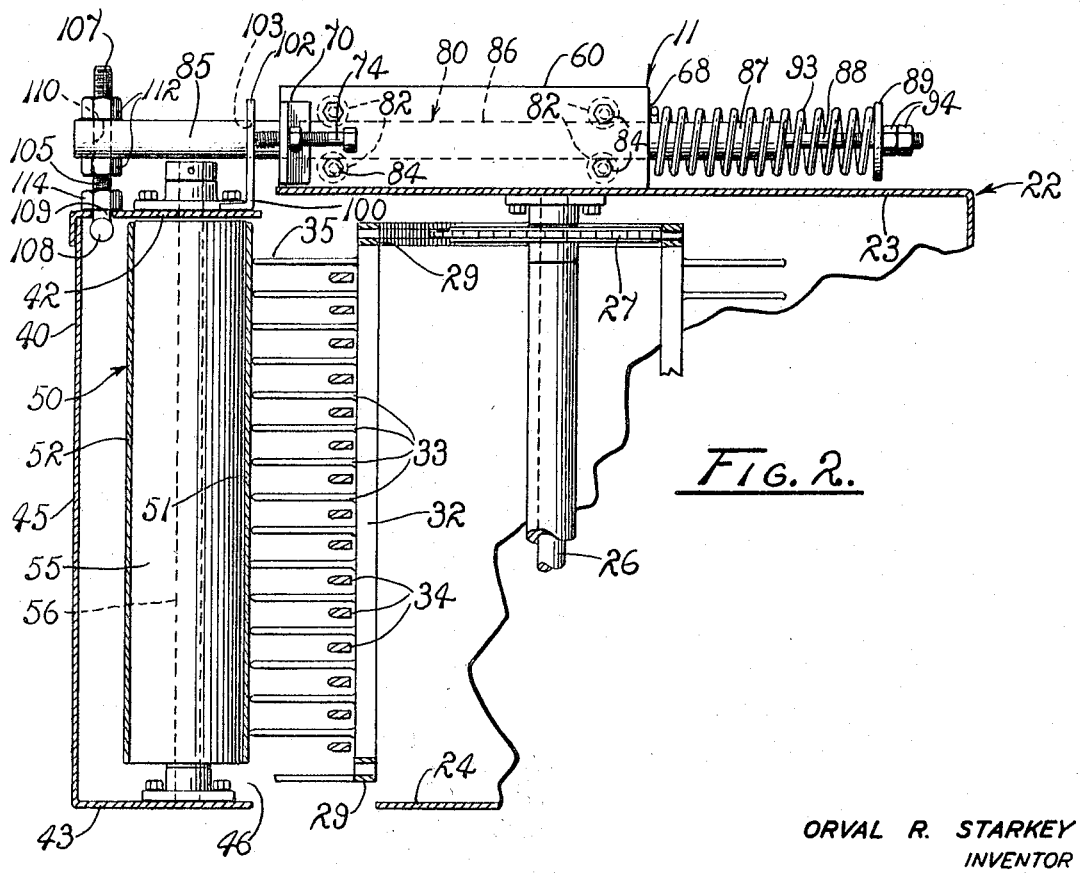
FIG. 2 is a somewhat enlarged fragmentary transverse vertical section through the cotton picker and compression apparatus taken on line 2—2 of FIG. 1, showing one arm of the suspension system in side elevation.

As best shown in FIGS. 1 and 2, the plant compressing apparatus 14 provides an elongated housing 40 having upper and lower spaced substantially parallel walls 42 and 43, respectively, which are interconnected by an outer side wall 45. The walls of the housing 40 thereby define an open inner side 46 adjacent to the picking zone 35 of the picking unit 12. An elongated endless substantially flat compressing belt 50 is disposed within the housing 40 and has an inner compressing run 51 adapted to be disposed in contacting relation with the ends of the spindles 33 or closely adjacent thereto. The belt includes an opposite outer run 52 and is trained for circuitous movement about a pair of spaced substantially parallel upright rollers 55 mounted on shafts 56 journaled at their upper and lower ends in the upper and lower walls of the housing. The rollers 55 are driven from the same power source as the spindle chains 29 and at a speed to move the inner compressing run 51 thereof at the same velocity and in the same direction as the spindles 33 through the picking zone 35. As described in greater detail in my above identified co-pending application the spindles and the inner compressing run of the belt remain substantially stationary with respect to the plants to preclude any scraping or relative sliding movement therebetween.

The arm assemblies 11 embodying the principles of the present invention provide an elongated tubular casing 60 which, as shown in FIG. 4, is substantially rectangular in cross-section and provides oppositely spaced side walls 62 and spaced upper and lower walls 63 and 64, respectively. The casing is rigidly secured to the upper wall 23 of the housing 22 as by welding at 66 with its longitudinal axis disposed substantially normal to the plane of the plant passage 15 through the picking unit 12. The casing includes an inner end 67 adjacent to the plant passage and an opposite outer end 68. A pair of hanger brackets 70 are individually rigidly mounted on the opposite side walls 62 of the casing adjacent to its inner end 67. Each of the hanger brackets provides an outer leg portion 72 which is disposed in coplanar relation with the inner end 67 of the casing. The leg portions individually screw-threadably mount elongated adjusting bolts 74 therethrough which are constrained in desired adjusted position by lock nuts 75.

An elongated rod-like support arm 80 is axially extended through the casing 60. The arm is supported for axial sliding movement relative to the casing by a pair of sets of arcuate rollers 82. The rollers are individually rotatably mounted within the casing on axle bolt and nut assemblies 84 extended between the side walls 62 adjacent to the inner and outer ends 67 and 68, respectively, of the casing. The arm includes an extensible supporting end 85 disposed in superimposed relation to the compressing apparatus 14, an intermediate portion 86 within the casing and an opposite outer end 87. The outer end has an elongated reduced diameter screw-threaded stud portion 88 which slidably mounts a spring retaining ring 89. An elongated compression spring 93 is disposed about the outer end 87 of the arm 80 between the outer end 68 of the casing and the ring 89 and is adjustably constrained in such position by a pair of lock nuts 94 screw-threadably mounted on the stud portion 88. In such position the compression spring imposes a force upon the arm 80 tending to urge the compression apparatus 14 toward the spindles 33 in the picking unit 12. A hanger bracket 100 is rigidly mounted on the upper wall 42 of the compressing apparatus housing 40, as by welding, bolting, or the like and provides a substantially upstanding arm portion 102. The arm portion has a circular bore 103 therethrough of a diameter slightly larger than the diameter of the support arm 80 so as loosely to receive the extensible support end 85 therethrough. A connector rod 105 provides an upper screw-threaded end 107 and a lower T end 108. The upper end of the connector rod is extended through an opening 109 in the upper wall 42 of the housing 40 closely adjacent to the outer side 45 thereof. The upper end is further extended through a bore 110 in the extensible support end 85 of the arm 80 for elevational adjustment by a pair of adjusting and locking nuts 112 which are tightened against the arm. An additional lock nut 114 is screw-threadably mounted on the upper end of the connector rod for tightening against the upper surface of the upper wall 42 of the housing 40. The lower T end 108 of the connector rod has an axis normally disposed in spaced substantially parallel relation to the passage 15 and to the direction of picker movement. Accordingly, the housing 40 of the compressing apparatus is rockable about the upper periphery of the T end of the connector rod with such movement permissible by the relatively loose connection between the hanger bracket 100 and the arm 80.

*Second form*

A second form of suspension system embodying the principles of the present invention is shown in FIG. 5. The casing 60 is substantially identical to the casing of the first form of the invention except for the addition of a pair of elongated slots 120 in the side walls 62 intermediate the ends of the casing. The support arm 80 is substantially identical to that of the first form except for the deletion of the stud portion 88 and the addition of an elongated pin 122 having opposite ends 123 outwardly extended from the arm through the slots 120 in the casing. The outer ends of the pin rigidly individually mount one end of a pair of tension springs 126 having their opposite ends secured to the upper wall 23 of the housing 22 of the picking unit 12 by screws 127. As in the first form, the tension springs 126 impose a force on the arm 80 tending to urge the compressing apparatus 14 toward the spindles 33 of the picking unit.

*Third form*

A third form of the present invention is shown in FIGS. 6 and 7 wherein the rectangular casing 60 of the previous forms is replaced by an elongated tubular sleeve 130 rigidly mounted, as by welding, on an elongated channel arm 132 similarly secured to the upper wall 23 of the housing 22. An enlarged substantially rectangular flange 134 is mounted on the end of the sleeve adjacent to the passage 15 for mounting the adjusting bolt and lock nut assemblies 135 in a similar manner to the adjusting bolt 74 of the first form. An elongated rod-like support arm 140, similar to the arm 80 of the first form, is employed but provides a stud portion 142 of a somewhat smaller diameter for axial sliding movement through a bearing and stop member 145 mounted in the end of the sleeve opposite to the plant passage 15. A spring retaining ring 146 and a pair of lock nuts 147 are mounted on the stud to constrain a compression spring 148 thereon in a manner similar to the constraint of the compression spring 93 of the first form.

*Operation*

The operations of the described embodiments of the subject invention are believed to be clearly apparent and are briefly summarized at this point. Before operation, the arm assemblies 11 of the suspension system may be adjusted so as to dispose the inner compression run 51 of the belt 50 in desired relation to the spindles 33 of the picking unit 12. As best shown in FIG. 2, the adjusting lock nuts 75 may be loosened and the adjusting bolts 74 actuated to extend or retract the compressing apparatus away from, or toward, the spindles in substantially parallel relation. Such movement is accomplished by engagement of the adjusting bolts with the arm portion 102 of the hanger bracket 100. The lock nuts 75 are then tightened against the leg portion 82 of the bracket 70 rigidly to hold the bolts in such adjusted position.

The adjusting nuts 112 and the lock nuts 114 may also be loosened elevationally to extend or retract the connector rod 105 for positioning and holding the inner run of the compression belt in a predetermined angular position with respect to the spindles 33. If the plants are larger adjacent to the ground, the connector rod may be elevated to swing the lower end of the compressing apparatus away from the spindles. The connector rod can also be lowered together with extension of the adjusting bolts 74 to position the upper portion of the compressing apparatus outwardly from the spindles where plants having larger upper portions are anticipated. The pre-load of the compression spring 93 may also be regulated by manipulation of the lock nuts 94 so as to adjust the compressive force exerted by the inner run of the compression belt against plants within the picking zone 35.

As is well-known, the picking unit 12 is carried on a self-propelled vehicle, not shown, and traverses a row of cotton plants aligned with the plant passage 15. During such movement of the picking unit 12 and the compressing apparatus 14, the spindles 33 and the inner compressing run 51 of the belt 50 are driven for travel through the picking zone 35 at the same velocity so as to remain substantially stationary relative to the plants passing therethrough. The plants entering the picking zone are trapped between the spindles and the inner run of the compressing belt and held in optimum upright position for engagement and penetration by the spindles of the cotton bolls on the plants.

As such plants move into the picking zone they force the compressing apparatus outwardly from the picking unit against the force of the compression spring 93. As described, the force of the springs 93 is readily adjusted so that the inner compressing run 51 of the belt 50 exerts optimum pressure to hold the plants against the spindles. It is apparent that with such lateral movement of the compressing apparatus exceptionally large plants are easily accommodated by the picking zone with a minimum of disturbance and damage to the plants. Furthermore, with the pair of arm assemblies 11 being spaced adjacent to the ends of the belt, such apparatus easily accommodates successive large and small plants and is effective to maintain substantially equal compression throughout the length of the belt. It is also significant that the compressing apparaus is moved toward and from the spindles in the precise attitude of its original pre-set attitude to the spindles. If the plane of the belt is tipped from the plane of the spindles in anticipation of a certain plant shape or size, the compression apparatus is moved outwardly from the spindles incident to the passage of the plants through the picking zone in the angular position of the predetermined setting and is returned to such position.

The operations of the second and third forms of the present invention are substantially similar to the first form in the operation of the compression apparatus per se. In the second form of FIG. 5, the springs 126 are tensioned during outward movement of the compression apparatus incident to the passage of plants through the picking zone by movement of the pin 122 with the support arm 80. As in the first form, the springs 126, like the compression springs 93, continually urge the inner compressing run of the belt toward the spindles. The compression springs 148 of the third form also operate in an identical manner as the compression springs 93 of the first form to urge the compression apparatus toward the spindles. In the latter embodiment, the support arm 140 slides axially through the sleeve 130 rather than on the rollers 82 in the rectangular casing 60 of the first and second forms.

In view of the foregoing, it is readily apparent that the structures of the three forms of the present invention provide an improved suspension system for plant compression apparatus on cotton pickers. All forms of the present invention provide a resilient substantially universal mounting for the compression apparatus so that the same may easily accommodate plants of various shapes and sizes and provide a compressive force against the plants in accordance with their size. The suspension system also permits substantially universal adjustment of the compression apparatus so as accurately to alter the configuration of the plant receiving passage through the picker with the compression apparatus being extensible and retractable in its adjusted relation to the spindles.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A suspension system, for supporting an elongated pressure member in a substantially upright plane in closely spaced adjacent relation to object engaging means forming therebetween an elongated passage providing a path of movement for objects of varied dimensions, comprising a connector member pivotally connected to said pressure member to permit adjustable movement of the pressure member to positions angularly disposed from said upright plane, and extendible arm means supporting said connector member for rectilinear transverse movement of the pressure member toward and away from said object engaging means in said adjusted positions to accommodate the passage to movement of objects of different sizes through the passage.

2. A suspension system, for supporting an elongated pressure member in a substantially upright plane in closely spaced adjacent relation to object engaging means forming therebetween an elongated passage providing a path of movement for objects of varied dimensions, comprising a connector member pivotally connected to said pressure member to permit adjustable movement of the pressure member to positions angularly disposed from said upright plane, extendible arm means supporting said connector member for rectilinear transverse movement of the pressure member toward and away from said object engaging means in said adjusted positions to accommodate the passage to movement of objects of various sizes through the passage, and resilient force means biasing said pressure member toward said object engaging means.

3. In a mechanical picker mounted for earth traversing movement, the combination of harvesting means mounted in the picker for circuitous movement through a predetermined elongated picking zone substantially aligned with the direction of movement of the picker; a reaction member; resilient suspension means adjustably mounting said reaction member on the picker in adjacent relation to the harvesting means and in a predetermined substantially upright plane, said suspension means including a force transmitting member to bias said reaction member toward the harvesting means but permitting rectilinear movement of the reaction member transversely outwardly of the picking zone away from said harvesting means to adjust the picking zone incident to movement of objects through the picking zone of various sizes.

4. In a mechanical picker mounted for earth traversing movement having crop harvesting means therein mounted for circuitous movement through a predetermined elongated picking zone substantially aligned with the direction of movement of the picker; a plant compressing apparatus providing a reaction member having an endless circumscribing surface; a resilient suspension system comprising arm means adjustably mounting said plant compressing apparatus on the picker for circuitous movement of said surface of the reaction member through said picking zone in adjacent relation to the harvesting means and in a predetermined substantially upright plane, an adjustable connector member suspended from said arm means having rockable connection to said compressing apparatus to permit substantially universal movement of the compressing apparatus transversely of the picking zone, biasing means on the arm means urging said compressing apparatus toward the harvesting means but permitting transverse outward movement of the compressing apparatus from the picking zone to adjust the same to movement of plants of varying sizes through the picking zone, and adjustable stop means on the picker to limit movement of the compressing apparatus toward the harvesting means.

5. In a mechanical picker mounted for earth traversing movement having crop harvesting means therein mounted for circuitous movement through a predetermined elongated picking zone substantially aligned with the direction of movement of the picker; a plant compressing apparatus providing a reaction member having an endless circumscribing surface; a resilient suspension system comprising an elongated arm mounting said plant compressing apparatus on the picker for circuitous movement of said surface of the reaction member through said picking zone in adjacent relation to the harvesting means and in a predetermined substantially upright plane, an adjustable connector rod having an upper end adjustably suspended from said arm and a lower T end having an axis substantially aligned with said direction of picker movement rockably supporting the compressing apparatus on the picker for substantially universal movement toward and from said harvesting means, biasing means on the arm urging said compressing apparatus toward the harvesting means but permitting transverse outward movement of the compressing apparatus from the picking zone to adjust the width of the picking zone to accommodate movement of plants of various sizes through the picking zone, and adjustable stop means on the picker to limit movement of the compressing apparatus toward the harvesting means.

6. In a mechanical picker mounted for earth traversing movement having crop harvesting means therein mounted for circuitous movement through a predetermined elongated picking zone substantially aligned with the direction of movement of the picker; a plant compressing apparatus providing a reaction member having an endless circumscribing surface; a resilient suspension system comprising an elongated arm having opposite inner and outer ends, means mounting the inner end of the arm on the picker for axial movement in a direction normal to the direction of picker movement, an adjustable connector rod having an upper end adjustably suspended from said outer end of the arm and a lower T end having an axis substantially aligned with said direction of picker movement rockably supporting the compressing apparatus on the arm having circuitous movement of said surface of the reaction member through said picking zone in adjacent relation to the harvesting means and in a predetermined substantially upright plane but permitting substantially universal movement of the reaction member toward and from said harvesting means, biasing means mounted on said inner end of the arm urging said compressing apparatus toward the harvesting means but permitting transverse outward movement of the compressing apparatus from the picking zone to adjust the width of the picking zone to accommodate plants of various sizes, and adjustable stop means mounted on said means mounting the arm on the picker to limit movement of the compressing apparatus toward the harvesting means.

7. In a mechanical picker mounted for earth traversing movement having crop harvesting means therein mounted for circuitous movement through a predetermined elongated picking zone substantially aligned with the direction of movement of the picker; a plant compressing apparatus providing a reaction member having an endless circumscribing surface; a resilient suspension system comprising an elongated arm having opposite inner and outer ends, means mounting the inner end of the arm on the picker for axial movement in a direction normal to the direction of picker movement, and adjustable connector rod having an upper end adjustably suspended from said outer end of the arm and a lower T end having an axis substantially aligned with said direction of picker movement rockably supporting the compressing apparatus on the arm having circuitous movement of said surface of the reaction member through said picking zone in adjacent relation to the harvesting means and in a predetermined substantially upright plane but permitting substantially universal movement of the reaction member toward and from said harvesting means, biasing means mounted on said inner end of the arm urging said compressing apparatus toward the harvesting means but permitting transverse outward movement of the compressing apparatus from the picking zone to adjust the width of the picking zone incident to movement of plants of various sizes through the picking zone, a hanger arm rigidly mounted on the compressing member in upstanding relation therefrom between said connector rod and said means mounting the arm on the picker, and adjustable means mounted on said means mounting the arm on the picker being engageable with said hanger arm to limit movement of the compressing apparatus toward the harvesting means.

References Cited

UNITED STATES PATENTS

| | | | |
|---|---|---|---|
| 2,961,819 | 11/1960 | Edwards | 56—30 |
| 2,988,863 | 6/1961 | Edwards | 56—30 |
| 3,082,590 | 3/1963 | Keith | 56—42 |
| 3,209,524 | 10/1965 | Keith | 56—42 |

ABRAHAM G. STONE, *Primary Examiner.*

RUSSELL R. KINSEY, *Examiner.*